UNITED STATES PATENT OFFICE.

JONAS W. AYLSWORTH, OF EAST ORANGE, NEW JERSEY, ASSIGNOR TO CONDENSITE COMPANY OF AMERICA, OF EAST ORANGE, NEW JERSEY, A CORPORATION OF NEW JERSEY.

PROCESS OF COMMINUTING PHENOLIC CONDENSATION PRODUCTS.

1,092,512.     Specification of Letters Patent.     Patented Apr. 7, 1914.

No Drawing. Original application filed August 6, 1910, Serial No. 575,970. Divided and this application filed November 4, 1910. Serial No. 590,600.

*To all whom it may concern:*

Be it known that I, JONAS W. AYLSWORTH, a citizen of the United States, and a resident of East Orange, in the county of Essex and State of New Jersey, have invented a certain new and useful Process of Comminuting Phenolic Condensation Products, of which the following is a description.

This application is a division of my application Serial No. 575,970, filed August 6, 1910, entitled Plastic composition and method of making the same.

My application above referred to relates to a new composition of matter and process of making the same, being specifically described in its application to the manufacture of duplicate sound records of either the cylindrical or disk type.

The invention of my present application relates to the production of a comminuted powder of an infusible phenolic condensation product which production comprises one of the steps of the process of my application Ser. No. 575,970, above referred to.

Condensation products of phenolic bodies and formaldehyde or other substance containing the methylene radical $CH_2$, in their final hard infusible condition, such as are obtained by methods disclosed in my Patent No. 1,020,593, dated March 19, 1912, and applications Serial Nos. 496,060, filed May 14, 1909, and 543,236 filed February 11, 1910, are preëminently suited as the material for forming the record surface of duplicate sound records, and the present invention may be practised for making the same of improved quality.

It is customary in the manufacture of sound records of various compositions and in the production of compositions to be molded generally to incorporate an inert filling body with the composition for the purpose of cheapening and toughening the same. Such a procedure, however, results in the formation of a sound record or other object of non-uniform texture, from which circumstance arise certain difficulties. The improved qualities of the composition comprising the invention of my application Serial No. 575,970 referred to, particularly when the same is formed into a sound record, are attained by forming the record or other object of a uniform texture and at the same time obtaining the advantages in manufacture and strength of a record or other object of non-uniform texture. That is to say, my improved composition in its final condition is a homogeneous mass of a final infusible insoluble phenolic condensation product. At the same time, the advantages of employing a non-homogeneous mass formed by the incorporation of a powdered or fibrous filling material with a binder are attained by the process I employ, in which a final hard infusible insoluble phenolic condensation product in comminuted condition is used as the filling body, being thoroughly mixed through a fusible soluble phenolic condensation product, with which is mixed a hardening agent such as hexa-methylene-tetra-amin, formaldehyde, or a polymer thereof, the hardening agent and the fusible product reacting upon application of sufficient heat to form the final infusible product, the comminuted infusible final product used as a filler becoming an integral part of the mass upon the completion of the reaction. In my application Serial No. 543,236, above referred to, I allude to the possibility of using infusible condensation products in powdered form as a filling agent in a composition for making sound records.

The use of filling bodies in compositions of the character referred to is advantageous in that they strengthen the product and overcome or counteract the stresses which are set up in the product, and cheapen and facilitate manufacture. Products of non-uniform texture, however, that is, those containing wood pulp, fiber, or other fillers of well known character, differing in character from the binding material, have the disadvantage when used for the production of sound records that they cause foreign sounds or scratching noises when the records are played, because of unequal expansion between the filler and the other elements of the composition, due to changes of temperature, and also due to the compression of the record and the subsequent release of the same when the records are molded by hydraulic presses or the like, which causes the air in the pores of the filler to be compressed and subsequently expand when pressure is released, which causes the surface of the object to be made microscopically rough.

Such records are also more susceptible to atmospheric influence generally than are records containing no such filling bodies, and if the filler is of a mineral nature, the reproducing stylus is apt to be worn thereby.

The invention of my application Serial No. 575,970 referred to comprises three steps. First, the production of a comminuted powder of an infusible condensation product of full degree of hardness. Second, the incorporation of the comminuted powder with an unhardened or fusible condensation product capable of being transformed into the infusible variety by heating to the required temperature. Third, the molding of the same in a sound record matrix or other matrix. The present application which is a division of application Serial No. 575,970 referred to, is particularly directed to the subject matter of the first step of producing the comminuted powder.

The first step may be carried out by forming the final product in any of the well known ways and mechanically comminuting the same to the required state of subdivision. The final infusible product may, however, be more easily crushed or comminuted in the following manner, which constitutes the subject matter of the present invention:—By causing the reaction to take place in such a manner in a volatile solvent that a porous easily comminuted product is obtained. To accomplish this result, the necessary ingredients from which the final product is formed by heat application are dissolved in a considerable amount of a suitable solvent, and the solution heated in such a manner that the solvent is prevented from escaping. The solvent should be used in an amount equal to or in excess of the amount of the reaction mixture. The temperature employed in the reaction may be from 200 to 260 degrees F. or higher, and the higher temperatures should be used if no condensing agent is employed in the process. A separation of the final infusible product from the solvent results, and the solvent is recovered by evaporation and condensation for subsequent use. By these means a microscopically porous substance somewhat resembling pith in porosity, is obtained. The pores or voids in the product are the spaces occupied by the solvent when the latter separates from the product during reaction. Such a separation does not take place if an insufficient amount of solvent is used, as in that case the small amount of solvent is retained tenaciously by the mass distributed in solution through the same and a porous mass does not result. The final insoluble infusible mass, which has been rendered microscopically porous by its formation in the solvent, may be comminuted while still contained in the solvent or after removal of the latter. Such removal, with heat, is rendered possible by the fact that the product, before crushing, is of the extremely porous character described, because of which connected microscopic passages are formed therein through which the solvent may be removed. Amyl acetate, alcohol, amyl alcohol, or other common solvents of the ingredients used for forming the product may be used in this process. Phenol, or the like, together with sufficient formaldehyde or other substance containing the methylene radical $CH_2$ to react together to form the final product, may be the substances dissolved in the solvent, and the final substance formed in one step from these primary ingredients, or if desired, a fusible soluble phenolic condensation product, such as described in my applications above referred to, together with approximately 10% or other suitable proportion of methylene-containing agent to react with the fusible product to form the final product, may be the ingredients used. If desired, a non-volatile solvent or a plasticity agent, such as described in my applications above referred to, such, for example, as mono-chloro-naphthalene, may also be a component of the reacting mass, in which case the dried infusible powder to be used as a filling body will possess the property of being plastic while hot to a greater degree than when the comminuted final condensation product without such plasticity agent is used as a filler.

The second and third steps in the process of application Serial No. 575,970, of which the present application is a division, are not relevant to the present invention, which relates to the subject matter of the first step of the said application, of producing the comminuted powder. Accordingly the said second and third steps need not be described here in any detail.

While the invention is specifically described in this application in connection with the manufacture of sound records, it is obvious that it may be used for molding various products.

Having now described my invention, what I claim and desire to protect by Letters Patent is as follows:—

1. The process of comminuting an infusible insoluble hard phenolic condensation product, consisting in dissolving in a sufficient amount of a suitable solvent a methylene-containing substance and a substance which will react therewith on application of sufficient heat to form a hard insoluble infusible phenolic condensation product, heating the same to cause the desired reaction while preventing the escape of the solvent, removing the solvent, and comminuting the insoluble infusible porous product resulting, substantially as described.

2. The process of forming a porous infusible insoluble hard phenolic condensation product, consisting in dissolving the components thereof in a sufficient amount of a suitable solvent, and heating the same in such a manner as to cause a solidifying and hardening reaction between the said components with separation of the solvent from the mass within the same to form pores while preventing the escape of the solvent, substantially as described.

3. The process of forming an infusible insoluble hard microscopically porous phenolic condensation product, consisting in dissolving in a suitable solvent a methylene-containing substance and a substance which will react therewith on application of sufficient heat to form an insoluble infusible phenolic condensation product, heating the same to cause the desired reaction while preventing the escape of the solvent in such a manner as to leave voids in the mass, and removing the solvent, substantially as described.

4. The process of forming a powdered infusible insoluble hard phenolic condensation product consisting in dissolving ingredients adapted to produce such a product by reaction, in an amount of a suitable solvent at least equal to the reaction mixture, and heating the same in such a manner as to cause a solidifying and hardening reaction between the said ingredients, while preventing the escape of the solvent from the surfaces of the product, with a resulting separation of the solvent from the mass within the same, to form small pores therein, filled with solvent, and comminuting the resulting infusible porous product, substantially as described.

This specification signed and witnessed this 1st day of November 1910.

JONAS W. AYLSWORTH.

Witnesses:
 DYER SMITH,
 ANNA R. KLEHM.